(12) United States Patent
Chen et al.

(10) Patent No.: US 7,714,528 B2
(45) Date of Patent: May 11, 2010

(54) FAN DRIVING CIRCUIT

(75) Inventors: Ying Chen, Shenzhen (CN); Jin-Liang Xiong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 296 days.

(21) Appl. No.: 11/842,166

(22) Filed: Aug. 21, 2007

(65) Prior Publication Data

US 2008/0166110 A1    Jul. 10, 2008

(30) Foreign Application Priority Data

Jan. 8, 2007    (CN) ................ 2007 1 0200015

(51) Int. Cl.
*G05B 11/28*    (2006.01)

(52) U.S. Cl. ............. 318/599; 318/400.01; 318/400.02; 318/700; 327/100

(58) Field of Classification Search ............ 318/59, 318/66, 68, 268, 280, 400.01, 599, 636, 650, 318/678, 700, 779, 811, 400.02, 400.22, 318/400.42, 439, 434; 388/814, 831; 327/100
See application file for complete search history.

(56) References Cited

U.S. PATENT DOCUMENTS

| | | | | |
|---|---|---|---|---|
| 4,926,104 A * | 5/1990 | King et al. ............... 318/599 |
| 5,197,858 A * | 3/1993 | Cheng ..................... 417/14 |
| 5,546,043 A | 8/1996 | Pollmeier |
| 5,572,099 A * | 11/1996 | Carobolante ............. 318/434 |
| 5,952,798 A * | 9/1999 | Jones et al. .............. 318/268 |
| 5,963,887 A * | 10/1999 | Giorgio ................... 702/64 |
| 6,157,151 A * | 12/2000 | Yoshitomi et al. ........ 318/400.2 |
| 6,310,453 B1 * | 10/2001 | Lin ......................... 318/445 |
| 6,349,385 B1 * | 2/2002 | Kaminski et al. ......... 713/300 |
| 6,381,406 B1 * | 4/2002 | Smith et al. .............. 318/799 |
| 6,515,447 B2 * | 2/2003 | Horng et al. ............. 318/807 |
| 6,617,709 B2 * | 9/2003 | Yu ........................... 307/119 |
| 6,617,815 B1 * | 9/2003 | Krief ....................... 318/471 |
| 6,674,257 B2 * | 1/2004 | Xi ........................... 318/400.22 |
| 6,779,981 B2 * | 8/2004 | Huang et al. ............. 417/42 |
| 6,856,110 B2 * | 2/2005 | De Winter et al. ....... 318/400.38 |
| 7,012,393 B2 * | 3/2006 | De Frutos et al. ........ 318/434 |
| 7,151,349 B1 * | 12/2006 | Williamson et al. ..... 318/400.37 |
| 7,193,385 B2 * | 3/2007 | Emadi et al. ............. 318/568.18 |
| 7,196,485 B1 * | 3/2007 | Lee et al. ................. 318/400.38 |

(Continued)

*Primary Examiner*—Bentsu Ro
*Assistant Examiner*—Antony M Paul
(74) *Attorney, Agent, or Firm*—Frank R. Niranjan

(57) ABSTRACT

A fan driving circuit includes a digital-analog converting circuit (10), an amplifier circuit (40), and a controlling circuit (50). The digital-analog converting circuit receives a digital signal from a controlling integrated circuit (IC), and outputs an analog signal. The amplifier circuit receives the analog signal from the digital-analog converting circuit, and outputs an amplified analog signal at an output terminal. The controlling circuit includes an isolation diode (D1), a transistor (Q1), and a resistor (R4), an anode of the isolation diode is coupled to an output terminal of the amplifier circuit, a cathode of the isolation diode is coupled to a base of the transistor, the base of the transistor is coupled to a power supply (Vcc1) via the resistor, a collector of the transistor is coupled to the power supply, an emitter of the transistor is coupled to a fan (60).

12 Claims, 2 Drawing Sheets

U.S. PATENT DOCUMENTS

| | | | |
|---|---|---|---|
| 7,205,733 B2 * | 4/2007 | Xiong et al. | 318/400.11 |
| 7,218,846 B2 * | 5/2007 | Wu et al. | 318/400.14 |
| 7,233,121 B2 * | 6/2007 | Wu et al. | 318/400.17 |
| 7,279,947 B2 * | 10/2007 | Chiu et al. | 327/172 |
| 7,444,070 B2 * | 10/2008 | Hahn et al. | 388/809 |
| 7,479,753 B1 * | 1/2009 | Mimberg | 318/599 |
| 7,545,112 B2 * | 6/2009 | Wu et al. | 318/592 |

* cited by examiner

FAN DRIVING CIRCUIT

BACKGROUND

1. Field of the Invention

The present invention relates to a fan driving circuit, and particularly to a fan driving circuit which stabilizes running of a fan.

2. Description of Related Art

Developments in today's highly information-intensive society have led to remarkable improvements in performances of electronic devices. During operation of many contemporary electronic devices such as central processing units (CPUs), large amounts of heat are produced. Typically, an electric fan is used to facilitate removal of the heat. The fan must run stably, so as to prevent the device from becoming unstable or being damaged. A driving circuit accompanying the fan is quite important to ensure normal running of the fan.

FIG. 2 shows a conventional driving circuit of a fan. A Pulse-Width Modulation (PWM) signal from a controlling integrated circuit (IC) drives transistors Q70 and Q100. The transistors Q70 and Q100 directly drive the fan. A high capacity electrolytic capacitor C63 is provided for wave filtering. But when a duty cycle of the PWM signal from the controlling IC is low, the transistor Q100 is turned off and causes fan failure.

What is needed, therefore, is to provide a driving circuit which can run a fan stably even if the duty cycle of the PWM signal is low.

SUMMARY

An exemplary fan driving circuit includes a digital-analog converting circuit, an amplifier circuit, and a controlling circuit. The digital-analog converting circuit receives a digital signal from a controlling integrated circuit (IC), and outputs an analog signal. The amplifier circuit receives the analog signal from the digital-analog converting circuit, and outputs an amplified analog signal at an output terminal. The controlling circuit comprises an isolation diode, a transistor, and a first resistor, an anode of the isolation diode is coupled to an output terminal of the amplifier circuit, a cathode of the isolation diode is coupled to a base of the transistor, the base of the transistor is coupled to a power supply via the first resistor, a collector of the transistor is coupled to the power supply, an emitter of the transistor is coupled to a fan.

Other objects, advantages and novel features of the present invention will become more apparent from the following detailed description of preferred embodiments when taken in conjunction with the accompanying drawings, in which:

DETAILED DESCRIPTION

Figure 1:
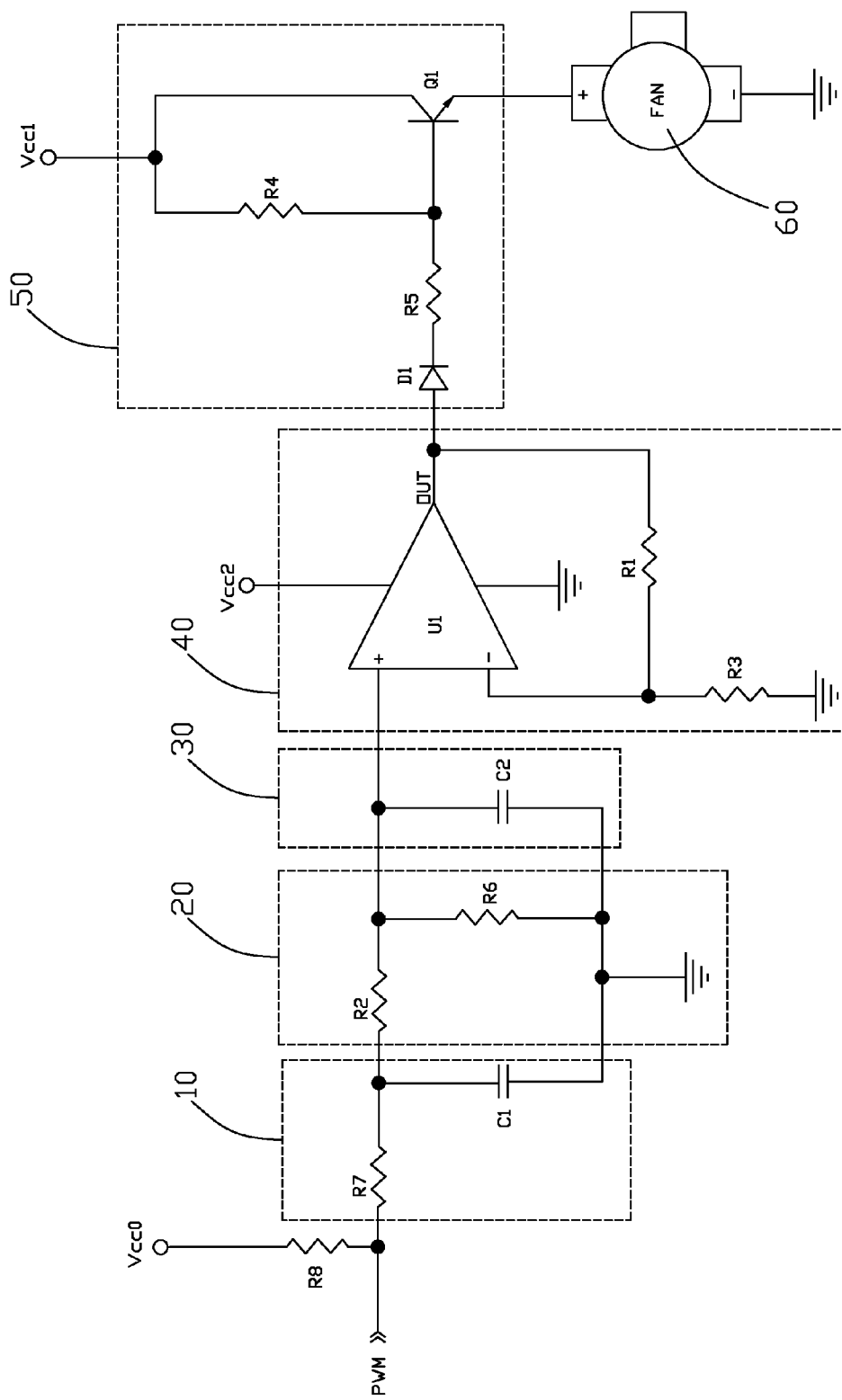
FIG. 1 is a circuit diagram of a fan driving circuit in accordance with an embodiment of the present invention.
Figure 2:
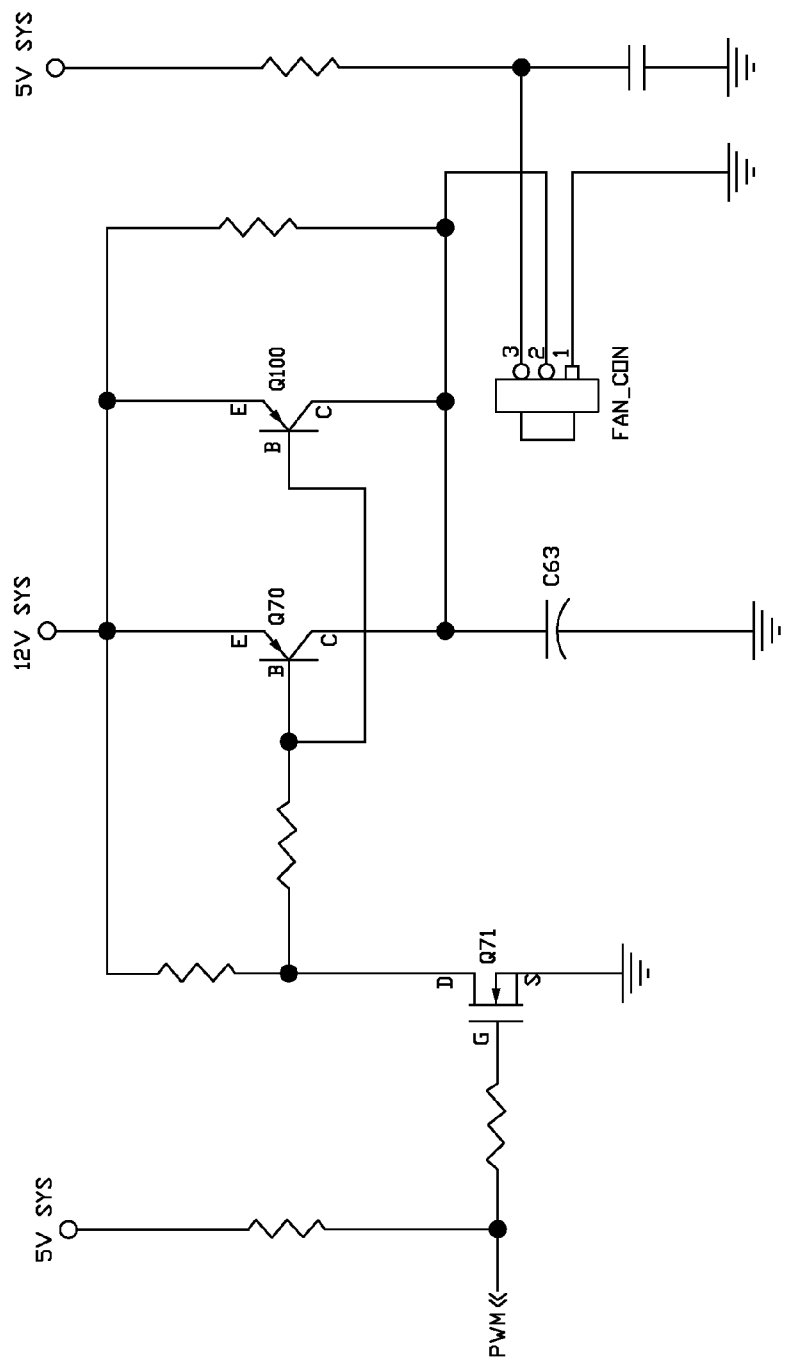
FIG. 2 is a circuit diagram of a conventional driving circuit of a fan.

Referring to FIG. 1, a fan driving circuit in accordance with an embodiment of the present invention includes a digital-analog converting circuit 10, a voltage sampling circuit 20, a filter circuit 30, an amplifier circuit 40, and a controlling circuit 50.

In this embodiment, The digital-analog converting circuit 10 includes a resistor R7, and a capacitor C1. One terminal of the resistor R7 is coupled to a power supply Vcc0 via a resistor R8, and receives a Pulse-Width Modulation (PWM) signal from a controlling integrated circuit (IC), another terminal of the resistor R7 is coupled to one terminal of the capacitor C1, another terminal of the capacitor C1 is coupled to ground.

The voltage sampling circuit 20 includes two resistors R2, R6. One terminal of the resistor R2 is coupled to a connection node between the resistor R7 and the capacitor C1, another terminal of the resistor R2 is coupled to one terminal of the resistor R6, another terminal of the resistor R6 is coupled to ground.

The filter circuit 30 includes a capacitor C2. The amplifier circuit 40 includes an amplifier U1 and two resistors R1, R3. One terminal of the capacitor C2 is coupled to a non-inverting input terminal of the amplifier U1, another terminal of the capacitor C2 is coupled to ground. An inverting input terminal of the amplifier U1 is coupled to ground via the resistor R3, the non-inverting input terminal of the amplifier U1 is coupled to a connection node between the resistors R2 and R6, an output terminal OUT of the amplifier U1 is coupled to the inverting input terminal of the amplifier U1 via the resistor R1.

The controlling circuit 50 includes a transistor Q1, an isolation diode D1, a resistor R4, and a current limiting resistor R5. A cathode of the isolation diode D1 is coupled to a base of the transistor Q1 via the current limiting resistor R5, an anode of the isolation diode D1 is coupled to the output terminal OUT of the amplifier U1. The base of the transistor Q1 is coupled to a power supply Vcc1 via the resistor R4, a collector of the transistor Q1 is coupled to the power supply Vcc1, an emitter of the transistor Q1 is coupled to a fan 60. Vcc1 need only supply enough power to keep the transistor Q1 on and drive the fan to rotate at a minimum desired speed should the PWM signal become too weak.

The digital-analog converting circuit 10 converts the PWM signal to a smooth analog signal. The analog control signal is input to the non-inverting input terminal of the amplifier U1 via the voltage sampling circuit 20 and the filter circuit 30. The output terminal OUT of the amplifier U1 is connected to the controlling circuit 50, the controlling circuit 50 limits the amount of current passing through the fan 60 to help maintain a steady rotation speed. If, however, the duty cycle of the PWM signal becomes too low or even reaches zero, and is thus unable to drive the amplifier U1, voltage from the power supply Vcc1, through the resistor R4, keeps the transistor Q1 on, thereby the power supply Vcc1 keeps the fan 60 rotating at a minimum speed until the duty cycle of the PWM recovers. As the duty cycle of the PWM signal increases, the output voltage of the amplifier U1 increases, too. As the output of the amplifier increases or recovers and becomes stronger than the signal from Vcc1, then current to the fan 60 increases, and the rotation speed of the fan 60 increases until it once again reaches the steady rotation speed.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. A fan driving circuit, comprising:
   a digital-analog converting circuit configured for receiving a digital signal from a controlling integrated circuit (IC), and outputting an analog signal;
   an amplifier circuit configured for receiving the analog signal from the digital-analog converting circuit, and outputting an amplified analog signal at an output terminal thereof and
   a controlling circuit comprising an isolation diode, a transistor, and a first resistor, an anode of the isolation diode coupled to the output terminal of the amplifier circuit to receive the amplified analog signal from the amplifier circuit, a cathode of the isolation diode coupled to a base of the transistor via a current limiting resistor, the base of the transistor coupled to a power supply via the first resistor, a collector of the transistor coupled to the power supply, an emitter of the transistor coupled to a fan.

2. The fan driving circuit as claimed in claim 1, wherein the driving circuit further comprises a voltage sampling circuit connected between the digital-analog converting circuit and the amplifier circuit configured for receiving the analog signal from the digital-analog converting circuit, and outputting a sampled analog signal to the amplifier circuit.

3. The fan driving circuit as claimed in claim 2, wherein the driving circuit further comprises a filter circuit configured for wave filtering of the sampled analog signal from the voltage sampling circuit before inputted into the amplifier circuit.

4. The fan driving circuit as claimed in claim 3, wherein the digital-analog converting circuit comprises a second resistor and a first capacitor, one terminal of the second resistor is coupled to another power supply and receives the digital signal from the controlling IC, another terminal of the second resistor is coupled to one terminal of the first capacitor, another terminal of the first capacitor is coupled to ground.

5. The fan driving circuit as claimed in claim 4, wherein the voltage sampling circuit comprises a third resistor and a fourth resistor, one terminal of the third resistor is coupled to a connection node between the second resistor and the first capacitor, another terminal of the third resistor is coupled to one terminal of the fourth resistor, another terminal of the fourth resistor is coupled to ground, a node between the third resistor and the fourth resistor coupled to the filter circuit.

6. The fan driving circuit as claimed in claim 5, wherein the filter circuit comprises a second capacitor, one terminal of the second capacitor is coupled to the node between the third resistor and the fourth resistor, another terminal of the second capacitor is coupled to ground.

7. The fan driving circuit as claimed in claim 5, wherein the amplifier circuit comprises an amplifier, a non-inverting input terminal of the amplifier is coupled to the connection node between the third resistor and the fourth resistor, an inverting input terminal of the amplifier is coupled to ground via a fifth resistor, an output terminal of the amplifier acting as the output terminal of the amplifier circuit is coupled to the inverting input terminal of the amplifier via a sixth resistor.

8. A driving circuit for a fan, comprising:
   a digital-analog converting circuit configured for converting a Pulse-Width Modulation (PWM) signal from a controlling integrated circuit (IC) into an analog signal;
   a voltage sampling circuit coupled to the digital-analog converting circuit and configured for receiving the analog signal and outputting a sampled analog signal;
   an amplifier circuit having an input terminal coupled to the voltage sampling circuit for receiving the sampled analog signal, and an output terminal for outputting an amplified analog signal; and
   a controlling circuit comprising an isolation diode, a transistor, and a first resistor, an anode of the isolation diode coupled to the output terminal of the amplifier circuit, a cathode of the isolation diode coupled to a base of the transistor, the base of the transistor coupled to a power supply via the first resistor, a collector of the transistor coupled to the power supply, an emitter of the transistor coupled to the fan such that when the duty cycle of the PWM signal becomes too low and unable to drive the amplifier circuit, voltage from the power supply is capable of keeping the transistor on to thereby allow the power supply keeping the fan rotating at a minimum speed.

9. The driving circuit as claimed in claim 8, wherein the digital-analog converting circuit comprises a second resistor and a first capacitor, one terminal of the second resistor is coupled to another power supply and the controlling IC to receive the PWM signal, another terminal of the second resistor is coupled to one terminal of the first capacitor, another terminal of the first capacitor is coupled to ground.

10. The driving circuit as claimed in claim 9, wherein the voltage sampling circuit comprises a third resistor and a fourth resistor, one terminal of the third resistor is coupled to a node between the second resistor and the first capacitor, another terminal of the third resistor is coupled to one terminal of the fourth resistor, the other terminal of the fourth resistor is grounded.

11. The driving circuit as claimed in claim 10, further comprising a filter circuit configured for wave filtering of the sampled analog signal from the voltage sampling circuit before inputted into the amplifier circuit, wherein the filter circuit comprises a second capacitor, one terminal of the second capacitor is coupled to a node between the third resistor and the fourth resistor and the input terminal of the amplifier circuit, the other terminal of the second capacitor is grounded.

12. A fan driving circuit, comprising:
   a digital-analog converting circuit receiving a digital signal, and converting the digital signal to an analog signal;
   a voltage sampling circuit sampling the analog signal;
   an amplifier circuit receiving the sampled analog signal, and amplifying the sampled analog signal; and
   a controlling circuit comprising an isolation diode, a transistor, and a first resistor, an anode of the isolation diode receives the amplified analog signal, wherein, a cathode of the isolation diode is coupled to a base of the transistor, the base of the transistor is coupled to a power supply via the first resistor, a collector of the transistor is coupled to the power supply, an emitter of the transistor is coupled to a fan, the transistor is turned on to drive the fan to rotate in response to receiving the amplified analog signal via the isolation diode.

* * * * *